United States Patent [15] 3,688,100

Goldsberry [45] Aug. 29, 1972

[54] RADIX CONVERTER

[72] Inventor: Paul E. Goldsberry, 313 Malabu Circle, Lexington, Ky. 40502

[22] Filed: June 30, 1970

[21] Appl. No.: 56,099

[52] U.S. Cl. ...........................235/155, 340/347 DD
[51] Int. Cl. ...............................................G06f 5/02
[58] Field of Search..340/347 DD; 255/155; 235/155

[56] References Cited

UNITED STATES PATENTS 2,620,974 12/1952 Valtat....................235/155 X

*Primary Examiner*—Maynard R. Wilbur
*Assistant Examiner*—Leo H. Boudreau
*Attorney*—John A. Brady, Paul D. Carmichael, D. Kendall Cooper, John F. Hanfin and J. Jancin, Jr.

[57] ABSTRACT

Apparatus for converting a number in a first radix to a number in a second radix is disclosed. Conversion of a binary number to a decimal number is accomplished by adding the low order of the decimal value for each position or ordinal in the binary number which contains a one bit or a number descriptor. Carries in the addition are ignored and the sum forms the low order ordinal in the decimal equivalent of the binary number. The sum is subtracted from the binary number and it is divided by the radix of the output number or ten. The series of operations is repeated until the binary number has been completely converted.

6 Claims, 5 Drawing Figures

INVENTOR.
PAUL E. GOLDSBERRY
BY John A. Brady
ATTORNEY.

$$B_{1_U} \equiv T_1$$

$$B_{1_D} \equiv \text{RESET}$$

$$B_{2_U} = \bar{B}_2 \bar{B}_4 \bar{B}_6 \bar{B}_8 T_2 C + B_4 T_8 C + B_6 T_6 C + B_8 T_4 C$$

$$B_{2_D} = B_2 C + \text{RESET}$$

$$B_{4_U} = \bar{B}_2 \bar{B}_4 \bar{B}_6 \bar{B}_8 T_4 C + B_6 T_8 C + B_8 T_6 C + B_2 T_2 C$$

$$B_{4_D} = B_4 C + \text{RESET}$$

$$B_{6_U} = \bar{B}_2 \bar{B}_4 \bar{B}_6 \bar{B}_8 T_6 C + B_8 T_8 C + B_2 T_4 C + B_4 T_2 C$$

$$B_{6_D} = B_6 C + \text{RESET}$$

$$B_{8_U} = \bar{B}_2 \bar{B}_4 \bar{B}_6 \bar{B}_8 T_8 C + B_2 T_6 C + B_4 T_4 C + B_6 T_2 C$$

$$B_{8_D} = B_8 C + \text{RESET}$$

RADIX CONVERTER

This application is a continuation application, Ser. No. 842,790, filed June 30, 1969 and now abandoned. Application Ser. No. 842,790 was itself a continuation application Ser. No. 439,791, filed Mar. 15, 1965 and also now abandoned.

Patent application Serial No. 439791 is a continuation-in-part of my copending patent application titled "Fractionating," Ser. No. 391,175, filed Aug. 21, 1964, and assigned to the same assignee as this application is assigned. Said copending application issued as U.S. Pat. No. 3,239,655 on Mar. 8, 1966.

Radix conversion has become a basic element of many data processing systems. This is true because the processing of numbers in the decimal or some other common system is often undesirable in view of the structures and systems used in data processing. The now familiar natural binary notation, for example, has many features and advantages desirable for use with the arithmetic, data processing, and logic elements of a machine. The display or output, however, generally is directed to a human observation. It then becomes necessary at some point in the cycle to convert natural binary notations into their equivalent in the notation used by the operator. That equivalent could be decimal notation, as is common in the United States, or it could be sterling notation, as is common in Britain. Radix conversion is often found also at the input, at which time a number in the radix common to the population is keyed into the machine in that radix. The entered number then must be converted to the machine notation, which may be a natural binary notation.

Radix conversion schemes for the above and similar purposes are well known. This invention differs over the prior art by providing a vastly improved radix conversion scheme. In this invention the value of the low ordinal of the output radix is obtained by one evaluation cycle and the remainder is prepared for a similar conversion to determine the values of the other ordinals. Although radix conversion by division with predetermined numbers is known and also radix conversion by evaluating logical equivalents of the machine number notation is known, it is believed that the present invention differs a significantly from the prior art by providing a system which is both fast and efficient in structure and which uses an evaluation cycle and a preparation cycle in a manner previously completely unappreciated.

It is an object of this invention to provide a radix converter system which is both fast and efficient in structure.

It is a further object of this invention to provide a radix converter system which requires a minimum of circuitry additional to that found in most prior data processing equipments.

It is a still further object of this invention to provide a natural binary to decimal radix converter which is significantly simplified over known systems.

It is a more specific object of this invention to provide a high speed and structurally efficient radix converter system which will convert natural binary notation into decimal notation by operating serially upon the binary word and by producing each decimal notation serially, all done with the use of a basic scheme requiring only a minimum of operations upon the natural binary word.

In accordance with this invention, the equivalent values of each ordinal of a machine notation are operated upon in such a way that those equivalents are restricted to a predetermined pattern. Special circuitry can therefore be provided which is efficiently constructed to operate only upon those equivalents.

More specifically, each position or ordinal in the machine radix number is known to contributes to the lower order of the output radix notation. For example, the natural binary notation columns increase in magnitude in the series 1, 2, 4, 8, 16, 32, 64, . . . $2^n$. Should a zero notation appear in each of these natural binary ordinals, the contribution to the low ordinal of a decimal notation would be zero. Should a 1 appear, however, at a given ordinal, that ordinal contributes a certain known magnitude to the low ordinal of the output number. Should a 1, for example, appear in the ordinal position having a decimal value of 64 of a natural binary number, this contributes a subtotal quantity of 4 to the low ordinal of the decimal notation of the same number. With this pattern in mind, a group of equivalents is thus defined. In the natural binary system, these equivalents are (with the exception of a 1 in the lowest ordinal, which must be considered a special case) the quantities 2, 4, 8, 6, In the preferred embodiment of this invention, utilization is made of the fact that the 2, 4, 8, 6 repeat themselves in the same sequence regardless of the number of high order natural binary ordinals under consideration.

In accordance with this invention, therefore, means are provided to generate the equivalent of each ordinal of the machine number. These ordinal equivalents are added as appropriate. In other words, for all locations at which the machine code indicates a certain significance in a certain ordinal, the equivalents are added in accordance with that degree of significance. With regard to a natural binary to decimal conversion, this is implemented by adding a full equivalent for each "one" in the natural binary notation, while adding nothing for each "zero." Carries are ignored in this addition since it is the low ordinal of the output radix which is being determined. Completion of this summation operation defines the low order in the output radix. An important feature of this invention is in the subsequent division of the machine stored number by the output radix magnitude. This casts the lowest order of the machine number below the decimal point where it is ignored. The remaining machine number is one in the identical format as the original number. The fact of the previous low ordinal determination can be ignored and a second low order determination can be made, this second ordinal being one ordinal higher in fact than the one previously determined. The second determination can be accomplished by a sequence of operations identical to and using the same equivalents and structures as the previous determination. These steps can be repeated using the same efficient structures until the entire radix conversion is completed.

Figure 1:
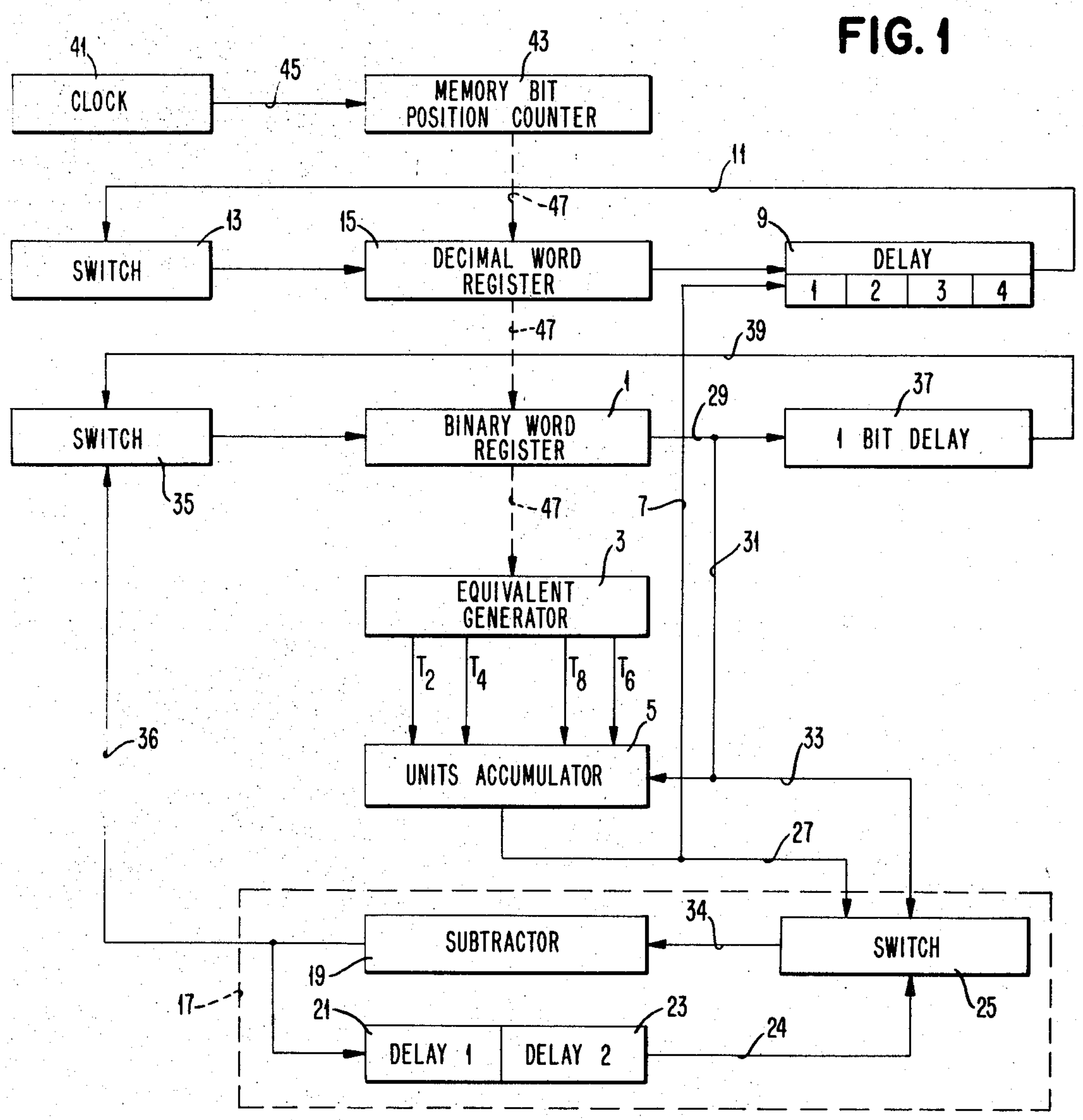
FIG. 1 shows a generalized diagram of the preferred system.

The foregoing and other objects, features and advantages of the invention will be apparent from the following more particular description of preferred embodiments of the invention, as illustrated in the accompanying drawings.

NUMBER NOTATION

A. The Type of Notation

For a more complete understanding of the preferred aspects of this invention, discussion will first be made concerning the decimal values of a whole number described in natural binary notation. These values are as follows: 1, 2, 4, 8, 16, 32, 64, 128, 256, 512, 1024, 2048, 4096, . . . $2^n$. When a whole number is described in natural binary notation, some of the ordinals carry a "zero" while the other ordinals carry a "one." This is well known. Only the ordinals which carry a one contribute to the final number. For example, the number 154 is described as:

| | | | | | | | | |
|---|---|---|---|---|---|---|---|---|
| Decimal Valve: | 1 | 2 | 4 | 8 | 16 | 32 | 64 | 128 |
| Number Descriptors: | 0 | 1 | 0 | 1 | 1 | 0 | 0 | 1 |

The decimal number total is a simple addition of the decimal values of the ordinals having "one" significance, in this case:

$$128+16+8+2=154$$

It will be noted further that each number descriptor has an independent significance related directly to the ordinal in which it appears. Thus, in natural binary notation, when a "one" number descriptor appears in the 128 ordinal, the final number is established as being at least 128 in value. The presence of a "one" number descriptor in some other ordinal defines a number to be added to the value 128. The presence of a "zero" number descriptor indicates that no addition is to be made. The bare existence of the "one" in the 128 ordinal is thus seen to define a subtotal which is a part of the final number, regardless of the other number descriptors.

This progression of decimal values is, in fact, the classical and often useful method of number notation. The decimal system responds to the same limitations. Thus, the number 58,024 is written as follows in decimal notation:

| | | | | | |
|---|---|---|---|---|---|
| Decimal Value: | 1 | 10 | 100 | 1,000 | 10,000 |
| Number Descriptors: | 4 | 2 | 0 | 8 | 5 |

In this case the first number descriptor, 4, establishes that the final number contains four parts of the position value, which is 1. This is true regardless of the other number descriptors. Similarly, in the above example, the 8 establishes that at least eight 1,000's exist in the number, regardless of the other number descriptors.

This invention is applicable to machine stored numbers described in a scheme of notation in which the value of each position describes a subtotal of the final number. Such a number will be said to be described in an accumulating scheme of notation. This term also should be understood to encompass a notation in which each number descriptor defines some value which is to be subtracted from a preselected value. Both natural binary and decimal notations are accumulating schemes of notation. The term "ordinal" in the specification and claims is employed in its normally accepted sense to refer to the position of a bit or other descriptor in a number.

B. The Output Radix Equivalent

Accumulating schemes of notation are often used in data processing systems. As discussed in the introduction of this patent application, conversion to a new radix is often essential so that, for example, a natural binary notation can be rendered intelligible to an untrained person be presenting the number in decimal form. In this invention the equivalent in the output radix of each ordinal value is determined and accumulated with the other equivalents.

Reference is made once again to the decimal values for a number described in natural binary notation. These values are as follows: 1, 2, 4, 8, 16, 32, 64, 128, 512, 1024, 2048, 4096, . . . $2^n$. If the equivalents in the low order of the decimal notation are examined, simplifications will be realized because the low order of a decimal notation must be a number between zero and nine. Higher values in the natural binary notation can therefore be ignored. Thus the equivalent in the decimal notation of the natural binary ordinals written above are: (written in the same order) 1, 2, 4, 8, 6, 2, 4, 8, 6, 2, 4, 8, 6 . . . .

In accordance with this invention these equivalents are summed, provided, of course, that a number descriptor indicates that the equivalents have significance in the number. For example, the number 154 is described as:

| | | | | | | | | |
|---|---|---|---|---|---|---|---|---|
| Decimal Value: | 1 | 2 | 4 | 8 | 16 | 32 | 64 | 128 |
| Number Descriptor: | 0 | 1 | 0 | 1 | 1 | 0 | 0 | 1 |

For radix conversion to decimal notation the equivalents of ordinals having number descriptors of "one" are summed. This is: 2 + 8 + 6 + 8 = 24. The high orders in this sum are not a part in the low order of the number in the new, decimal radix. Therefore, the 2 in the sum above is ignored and the 4 is recognized as the value of the lowest ordinal in decimal notation.

It is a further feature of the preferred aspects of this invention that the pattern of equivalents in decimal notation is recognized and used to advantage. Reference to the value of natural binary ordinals will establish that a repetitive pattern of 2, 4, 8, 6, 2, 4, 8, 6, 2, 4, 8, 6 . . . exists. Only the equivalent of 1, which is for the lowest ordinal, must be handled specially.

THE SYSTEM

An illustrative sequence through the system will now be described. Reference is made to FIG. 1.

A. Elements of System

The system contains a binary word register 1. The binary word register 1 holds a number described in natural binary notation. That number usually has been created as the product of a data processing operation of a machine constructed to process data in natural binary notation.

The binary word register 1 is operatively connected to an equivalent generator 3. The conversion is to be to decimal notation. The equivalent generator 3 therefore has the capability of automatically responding to a signal indicative of each binary ordinal accessed in binary word register 1 to generate the low order decimal equivalent of that ordinal.

The units accumulator 5 is an adder which is especially suited to sum all the decimal equivalents as they are generated. Means are provided to suppress the summing of equivalents in binary ordinals carrying zero significance. This sum, with carries ignored, is the low order of the natural binary number described in the decimal radix. Each decimal ordinal value may be presented in the common binary coded decimal notation or in some special purpose notation. In the preferred embodiment of this invention, each decimal ordinal value is originally generated in a special purpose notation which is useful because of the special accumulator used. It is translated immediately, however, to the binary coded decimal notation.

The output of the units accumulator 5 is connected through line 7 to delay register 9. It is thus delay register 9 which receives the low decimal ordinal and preserves it. Ultimately the low decimal ordinal may be transported through line 11, under control of switch 13, to be more permanently stored in the decimal word register 15. Decimal word register 15 is provided to retain the converted result. A typewriter-like printer which responds to binary coded decimal notation may be provided to display the contents of decimal word register 15.

When the low ordinal of the output number is determined, it is a feature of this invention that the contents of the binary word register 1 are then divided by the output radix value, and the resulting ordinals of the quotient are reinserted in the binary word register 1. To accomplish this a divider 17 is provided. The details of the divider 17 are fully described in above mentioned U.S. Pat. No. 3,239,655. The combination of the subtractor 19, the first delay 21 and the second delay 23 connected through line 24 in the manner therein described achieve a division by five of the number in the binary word register 1. Only two serial passes of the natural binary number in word register 1 are required to achieve the division. More expensive dividers might make possible the division in one serial pass.

Initially, to achieve division in accordance with the above mentioned patent; the natural binary number must be rendered evenly divisible. In this invention, therefore, under the control of switch 25, the contents of the units accumulator 5 are connected to subtractor 19 through line 27. Under the control of switch 25, the contents of binary word register 1 are connected through lines 29, 31, 33, and 34 to subtractor 19. The contents of binary word register 1 and units accumulator 5 are presented to subtractor 19 alternately, a bit at a time. A subtractor which operates upon natural binary numbers presented alternately and in sequence to provide an immediate series of natural binary descriptors indicating the difference is described in U.S. Pat. No. 3,209,132, filed Aug. 28, 1962, issued Sept. 28, 1965, by W. L. McDonald and assigned to the same assignee as this patent application is assigned. The switch 35 opens at proper times to receive the difference digits from line 36 and to insert them into binary word register 1. Since the division accomplished is by five, a second cycle is needed in which the quotient stored in binary word register 1 is stepped out of line 29 into a one bit delay register 37. The number is reinserted in binary word register 1 through line 39 under the control of switch 35. This divides the quotient by 2 to thus complete dividing the original number by 10. In this preferred embodiment the number being divided is first reduced to a value in which no one bits will appear in the quotient in an ordinal lower than the low ordinal of the number being divided. If a different divider is used, the first stage of binary word register 1 can be arbitrarily designated as the first stage above the decimal point. During the division values cast below the decimal point should be ignored. Regardless of the division means used, ordinals of the quotient identical to the ordinals of the original number are those reinserted in binary word register 1.

Accessing of memory positions in the system originates with clock 41, which steps memory bit position counter 43. The clock 41 provides effective counting pulses on line 45 at regular intervals. The memory bit position counter operates in a natural binary fashion. Thus, several output stages are provided and they are energized in a progression entirely equivalent to the natural binary progression.

A counting sequence is illustrated by the following table. One condition of the counting stages is arbitrarily designated as "UP," while the obverse condition is arbitrarily designated as "D," (for Down).

TABLE I

| TOTAL CLOCK PULSES | STAGES 6 | 5 | 4 | 3 | 2 | 1 |
|---|---|---|---|---|---|---|
| 1 | D | D | D | D | D | D |
| 2 | D | D | D | D | D | UP |
| 3 | D | D | D | D | UP | D |
| 4 | D | D | D | D | UP | UP |
| 5 | D | D | D | UP | D | D |
| 6 | D | D | D | UP | D | UP |
| 7 | D | D | D | UP | UP | D |
| 8 | D | D | D | UP | UP | UP |
| ....... | .. | ... | .. | ... | .. | .... |
| 27 | D | UP | UP | D | UP | D |

The system is completed by the dashed line 47, which is symbolic of the simultaneous addressing and control of the decimal word register 15, the binary word register 1, and the equivalent generator 3 by the memory bit position counter 43.

The preferred embodiment of this invention uses conventional magnetic core registers and conventional driving means to access the registers. The switches used are simple electrical gates. Data flow is controlled by timing pulses created in predetermined sequences by logic responding to the pulsations of a free running oscillator. The registers and data flow are therefore state of the art and will not be described in detail here. The memory bit position counter 43 is included in some detail only because the output is used in accordance with this invention to achieve unique advantages. Many prior art systems include a memory bit position counter 43. It is a feature of this invention that the counter can be used to great efficiency with the equivalent generator 3.

B. System—Illustrative Sequence

In a usual system the binary word register 1 will initially contain a number expressed in natural binary notation while the rest of the system is cleared of numerical notations. In this illustrative sequence the natural binary number 429 will be assumed. This is described in natural binary notation as:

| | | | | | | | | | | |
|---|---|---|---|---|---|---|---|---|---|---|
| Decimal Value: | 1 | 2 | 4 | 8 | 16 | 32 | 64 | 128 | 256 | 512 |
| Number Descriptor: | 1 | 0 | 1 | 1 | 0 | 1 | 0 | 1 | 1 | 0 |

Under the control of memory bit position counter 43 the low order of the binary number is read and recognized as a "one." The decimal equivalent 1 is therefore entered into the units accumulator 5. Nest in time, the next binary ordinal is read, but it being a "zero," no equivalent is summed. The units accumulator 5 remains at 1. Next in time the four ordinal is read. It being a "one," the equivalent 4 is generated by the equivalent generator 3 and entered into units accumulator 5. The accumulator 5 then stands at the value five. The above steps are repeated for the higher natural binary ordinals. Briefly, the following occurs. A "one" in the 8 ordinal results in the equivalent 8 bringing the accumulator 5 to the value 3 (carries are ignored). The "-zero" in the 16 ordinal indicates no equivalent. The "one" in the 32 ordinal results in the equivalent 2 bringing the accumulator 5 to the value five. The "-zero" in the 64 original indicates no equivalent. The "one" in the 128 ordinal results in the equivalent 8 bringing the accumulator to 3 (carries are ignored). The "one" in the 256 ordinal results in the equivalent 6 bringing the accumulator to 9. Zeros in the higher binary ordinals indicate no effective equivalence.

When the entire binary word register has been scanned, the units accumulator value is temporarily stored in delay register 9. Simultaneously, under the control of switch 25 the value in the units accumulator 5 is subtracted by subtractor 19 from the value in the binary word register 1. This value is reinserted in binary word register 1 under the control of switch 35. Thus, the value 9 is subtracted from the value 429, and the natural binary notation for 420 is then inserted in binary word register 1.

A second cycle follows, this cycle being the divide by 5 cycle. In accordance with the division system described in the above referenced U.S. Pat. No. 3,239,655, the switch 25 admits only bits of information from the binary word register 1. The switch 25 also opens line 24 to permit the delays 21 and 23 to be effective. The natural binary notation for one-fifth of 420 appears on line 36 at the output of the subtractor 19. This is the value 84. Under the control of switch 35 this value, in natural binary notation, is inserted into binary word register 1. To complete the division by the output radix (10 in the decimal system) a one-bit delay is then accomplished through line 29, delay 37, line 39, and switch 35. This automatically divides 84 in natural binary notation by 2. The natural binary notation for 42 now stands in the accumulator. This is described as follows:

| | | | | | | | |
|---|---|---|---|---|---|---|---|
| Decimal Value: | 1 | 2 | 4 | 8 | 16 | 32 | 64 |
| Number Descriptor: | 0 | 1 | 0 | 1 | 0 | 1 | 0 |

The above described conversion cycle for the natural binary number 429 is now repeated for the natural binary number 42. The division by 10 has created a quotient in binary word register 1 which may be converted by the same structures and timing.

Briefly, the equivalents 2, 8, 2 are summed to produce a result of 2. The structures and steps used are essentially identical to those in which the low order decimal ordinal was determined. Similarly, using the same structures and steps, the accumulator value (two) is subtracted from the value 42 then in the binary word register 1, and the division by 10 is accomplished.

The number 4 is thus finally inserted in binary word register 1. The numbers 9 and 2 have been generated in units accumulator 5. Before the end of each cycle the numbers have been stored temporarily in delay register 9 and subsequently they may be transferred through line 11 under control of switch 13 to decimal word register 15. At the time when the number 4 is finally inserted in binary word register 1, decimal word register 15 holds a four-bit binary notation of 9 followed by a four-bit binary notation of 2, assuming that the numbers were transferred to decimal word register 15 rather than being printed out directly from delay 9.

The above described conversion cycle for the natural binary number 429 and for the natural binary number 42 is now repeated for the natural binary number 4. The natural binary number four is written as follows:

| | | | | |
|---|---|---|---|---|
| Decimal Value: | 1 | 2 | 4 | 8 |
| Number Descriptor: | 0 | 0 | 1 | 0 |

Only a single equivalent exists, the other ordinals having zero significance. The result of 4 is entered into units accumulator 5. The structures and steps of all operations are essentially identical to those in which the other decimal ordinals were determined and stored.

Figure 2:
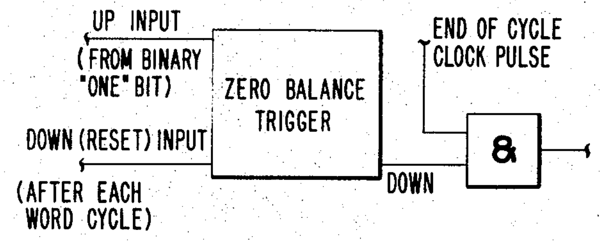
FIG. 2 illustrates the zero balance logic of the preferred system.

Preferably, a zero balance test is made at binary word register 1 during each cycle. When a zero status is recognized, the radix conversion operation is then stopped. The zero balance technique used is to simply connect the "Up" input of a trigger to the output of the binary word register 1 (see FIG. 2). Any "one" bit read will irreversibly switch the zero balance trigger. At the end of a read cycle a clock pulse is ANDed with the Down output of the zero balance trigger. An output from this AND gate establishes that binary word register 1 carries a zero indication. In the preferred use with a data processing apparatus the zero balance pulse would connect to programming means of the data processing apparatus to initiate a routine which is intended to follow radix conversion.

EQUIVALENTS GENERATOR AND UNITS ACCUMULATOR

A. Equivalents Generator

Certain factors having to do with the major steps of each cycle of the preferred embodiment will be discussed below. Prior to that discussion, however, an understanding of the special features of the preferred equivalent generator 3 and the preferred units accumulator 5 is desirable. These units are special purpose structures, and it is believed that significant and individually inventive advantages are produced by their use.

Figure 3:
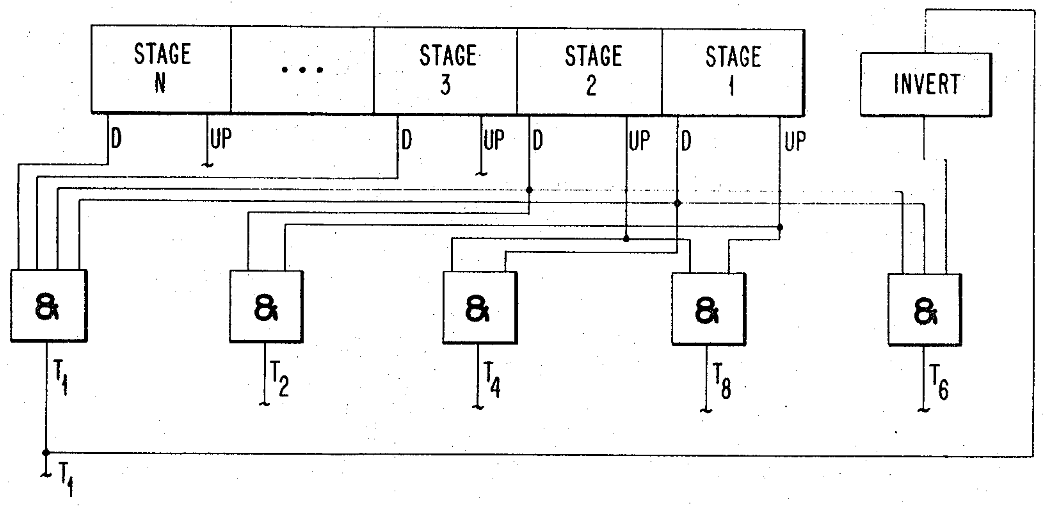
FIG. 3 illustrates the equivalents generator logic of the preferred system.

The equivalent generator 3 is operated directly from the memory bit position counter 43. Reference is made to FIG. 3. The counter 43 steps to new conditions in a fashion entirely comparable to an ordinary counter operating in natural binary notation. This is detailed in the preceding Table I and can be visualized mentally by those familiar with the natural binary notation. Each unique status of all of the stages of the memory bit position counter 43 is associated by appropriate and entirely conventional logic with means to access unique bit positions in decimal word register 15 and binary word register 1. A progressive, sequential access to all stages of the two registers is thus provided under the control of memory bit position counter 43, which is stepped by the clock 41.

In accordance with this invention the starting (cleared) status of memory bit position counter 43 is one in which all stages of the counter 43 are Up. The first effective control pulse from clock 41 therefore brings the counter 43 to a status in which all stages are Down. This status is recognized by the above mentioned appropriate and conventional logic to access the lowest order bit position of both decimal word register 15 and binary word register 1.

This lowest order bit position corresponds to the natural binary ordinal in which the decimal equivalent falls without the usual pattern of 2, 4, 8, 6 above discussed. Therefore one element of the equivalent generator 3 provided consists of means to provide a signal, herein denominated $T_1$, when all stages of the counter 43 are down. Any conventional AND circuit will provide this response. The signal $T_1$ is the equivalent generator output indicative of an equivalent 1. It will be noted that further advances of the clock 43 will all result in a count status in which at least one stage is Up. The $T_1$ equivalent will therefore only be generated once in any access cycle.

The pattern of equivalents, 2, 4, 8, 6, 2, 4, 8, 6, 2 . . . etc. can be related directly to the first stages of counter 43 as counter 43 counts beyond 1. The second effective pulse will bring the first stage Up while leaving the second stage Down. Logic means are provided to recognize this status of the first two stages whenever it occurs. This logical signal is designated $T_2$ and is the equivalent generator output indicative of 2. It will be clear upon reflection that counter 43 is at the count which directs access to the second stage of binary word register 1. The decimal equivalent of this stage is 2. Furthermore, four counts later the counter 43 will be directing access to the sixth stage of binary word register 1, and the first stage of counter 43 will be Up and the second stage of counter 43 will be Down. The sixth stage of binary word register 1 is the 32 ordinal, which has the decimal equivalent of 2. This is a manifestation of the fact that the two low order stages of a natural binary count repeat a cycle every four counts. Since the decimal equivalents follow a repeating cycle in four ordinals, the $T_2$ signal above defined will indicate a correct equivalent of 2 for conversion to decimal notation regardless of the actual size of the count.

Similarly, logic means are provided to produce a different logical signal, designated $T_4$, when the first stage of counter 43 is Down, while the second stage is Up. The signal $T_4$ is the equivalent generator output indicative of four. It will be recognized that at the third count, when the first stage of counter 43 is Down and the second stage is Up, the stage of binary word register 1 which holds the four ordinal is being accessed. The equivalent of this is four, and this equivalent will reoccur with every fourth count in the manner above described for the equivalent two. Thus, the $T_4$ signal, which is produced by the first two stages of counter 43, occurs each time and only when the natural binary stage being accessed has a decimal equivalent of four.

The same reasoning as that just recited is applied in generating a single signal $T_8$ for the eight equivalent and a single signal $T_6$ for the six equivalent. To generate $T_8$ logical means are provided to generate a single logical signal when both of the first two stages of the counter 43 are Up. To generate $T_6$ logical means are provided to generate a single logical signal when both of the first two stages of counter 43 are Down, but at least one other stage is Up. As above pointed out, when all the counter stages are Down, $T_1$ is generated. FIG. 3 is illustrative of this generation of equivalents.

B. Units Accumulator

Further efficiencies are realized by the special construction of the units accumulator 5. The structure of accumulator 5 is optimized by providing logic especially directed to the purposes at hand. Such logic is shown schematically in FIG. 4. The units accumulator 5 is seen to consist of five bistable latching devices, $B_1$, $B_2$, $B_4$, $B_6$, and $B_8$. Latching circuits are well known in the art and therefore will not be described herein. The logic shown in FIG. 5 is specifically directed to the accumulating function to be accomplished. The accumulator is directly switched to the proper value by the logic provided.

By way of example, it can be assumed that a $T_2$ equivalence signal is recognized. The accumulator stages $B_1$, $B_2$, $B_4$, $B_6$, and $B_8$ may have previously been in any status. Nevertheless, the logic used assures the proper, additive advancement of the accumulator. The entire logic control of the accumulator is as follows: conventional Boolean symbols will be used. $B_{x_U}$ indicates that the accumulator stage denominated by the number indicated where x appears is brought to an arbitrarily designated positive (Up) setting. $B_{x_D}$ indicates that the accumulator is brought to a second setting, arbitrarily predesignated as Down. The Up status of the stages at the time of switching are written as $B_x$ while the Down status of the stages are written as $\bar{B}_x$. It will be understood that the logic presented is timed in a conventional manner with the use of a suitable clock source. The + sign is standard Boolean indicating OR logic. The C signal indicates the existence of a binary "one" in the ordinal of the natural binary number being accessed.

$$B_{1_U} = T_1 C$$
$$B_{1_D} = \text{Reset}$$
$$B_{2_U} = \bar{B}_2\bar{B}_4\bar{B}_6\bar{B}_8T_2C + B_4T_8C + B_6T_6C + B_8T_4C$$
$$B_{2_D} = B_2C + \text{Reset}$$
$$B_{4_U} = \bar{B}_2\bar{B}_4\bar{B}_6\bar{B}_8T_4C + B_2T_2 + B_8T_6 + B_6T_8C$$
$$B_{4_D} = B_4C + \text{Reset}$$
$$B_{6_U} = \bar{B}_2\bar{B}_4\bar{B}_6\bar{B}_8T_6C + B_8T_8C + B_2T_4C + B_4T_2C$$
$$B_{6_D} = B_6C + \text{Reset}$$
$$B_{8_U} = \bar{B}_2\bar{B}_4\bar{B}_6B_b\bar{B}_8T_8C + B_2T_6C + B_4T_4C + B_6T_2C$$
$$B_{8_D} = B_8C + \text{Reset}$$

It will be noted in the logic provided that a Down signal is generated for each stage $B_2$, $B_4$, $B_6$, $B_8$ at each logic time when that stage is Up. This is a clearing signal. The remainder of the logic is effective to analyze the status of all stages $B_1$, $B_2$, $B_4$, $B_6$, and $B_8$. The change in status of the circuits provided by the analyzing logic occurs in finite transient time. None of the stages $B_1$–$B_8$ are cleared during this finite transient time. The latches $B_1$–$B_8$ display sufficient electrical inertia to remain in the previous state until the analyzing circuitry is effective to bring the proper B latch up. Since a value of 10 or more never appears as an equivalent, the logic is uncomplicated in the sense that a Down input will never oppose an Up input.

Figure 4:
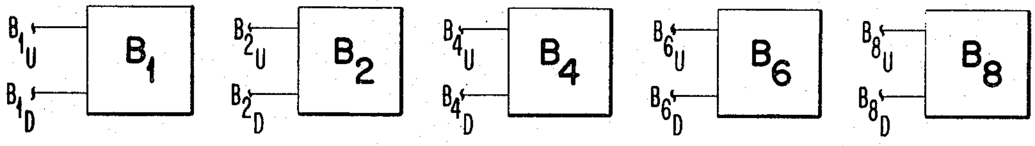
FIG. 4 illustrates the special purpose accumulator of the preferred system.
Figure 5:
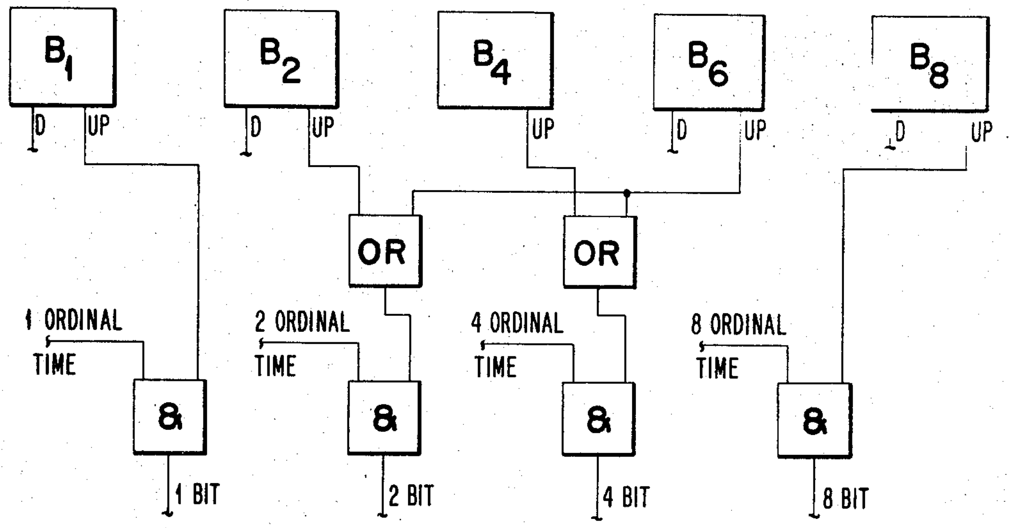
FIG. 5 illustrates the preferred decoding system out of the accumulator.

Every permutation of different conditions of the B stages need not be discussed in detail in order to establish the ability of the units accumulator 5, as illustrated in FIG. 4, to function. Only a single equivalent signal $T_1$, $T_2$, $T_4$, $T_6$, or $T_8$ is generated at a single time. That signal is analyzed along with the previous stages of the B stages to control the bringing up the proper stage.

Returning to the example used previously for the conversion of the natural binary number 429, at the units ordinal time a $T_1$ and C signal is produced. The C signal is indicative of the binary "one" significance of the units ordinal of a natural binary notation of 429. As seen from the logic, $T_1$ is effective to bring $B_1$ Up. At the two ordinal time a $T_2$ signal is produced, but this signal is ineffective at the accumulator because the absence of a one bit in the two ordinal results in no C signal being produced. At the four ordinal time, a $T_4$ signal is produced. Since a one bit exists in the natural binary number at that ordinal, a C signal is also produced. The accumulator had stood with the $B_1$ Up and the other B stages down. Reference to the logic for the $B_4$ stage indicates that when $B_2$, $B_4$, $B_6$, $B_8$ are Down and when a $T_4$ and a C signal are produced, the $B_4$ stage is bought Up. Reference to the other logic will establish that no other stage is brought Up under these conditions. Therefore the accumulator stands with the $B_1$ stage Up and the $B_4$ stage Up, indicating a subtotal of 5 in the accumulator. At the eight ordinal time, a $T_8$ signal is generated. The logic $B_{2_U}$ indicates that existence of a $B_4$ Up, a $T_8$, and C does, in fact, bring $B_2$ Up. Since no logic exists to bring $B_4$ Up at this timing period, the $B_4$ Down input of $B_4$ and C is effective to bring $B_4$ Down. The accumulator therefore stands with $B_1$ Up and $B_2$ Up indicating a subtotal of 3.

At the 16th ordinal time a $T_6$ signal is produced. However, no bit is in the natural binary number at this ordinal and a C signal is therefore not produced. The accumulator is thus left unaffected and continues to stand with a subtotal value of 3.

At the 32nd ordinal time a $T_2$ signal is produced. Since a binary "one" appears in that ordinal of the natural binary number, a C signal is also produced. Reference to the Up logic for the $B_4$ latch indicates that the combination of $B_2$, $T_2$, and C will produce a signal bringing $B_4$ Up. Since at this time no logical signal exists to bring $B_2$ Up, the $B_2$, C logical input to $+B_{2_D}$ is effective to bring $B_2$ Down. The accumulator therefore stands with $B_4$ Up and $B_1$ Up indicating a subtotal of 5.

At the 64th ordinal time a $T_4$ signal is produced, but the absence of a one bit in the binary number results in no C signal being produced. The absence of the C signal leaves the units accumulator unchanged. The units accumulator therefore continues to stand at the value 5.

At the 128th ordinal time $T_8$ signal is produced. Since a one bit is found in the natural binary number, a C signal is produced. Reference to the $B_{2_U}$ logic establishes that $B_4$ Up, as it previously is, along with the $T_8$ signal and the C signal produced, bring $B_2$ Up. On the other hand, no $B_{4_U}$ logical signal is created and $B_4$ is therefore brought down by the $B_4$, C signal creating $B_{4_D}$. The accumulator therefore stands with $B_1$ Up and $B_2$ Up indicating a subtotal of 3.

At the 256th ordinal time a $T_6$ is produced. Reference to the Up logic for the $B_8$ stage indicates that when a $B_2$ signal exists and when the $T_6$ signal is created along with a C signal, the $B_8$ register is brought Up. No Up signal is generated at the $B_{2_U}$, so it is brought down by its $B_2$, C input. The accumulator therefore stands with $B_1$ Up and $B_8$ Up, for a subtotal 9.

At the 512th ordinal time a $T_2$ signal is generated, but the zero in the number value of the binary number results in no C signal being generated. The accumulator therefore stands at the value of 9. This is the last natural binary ordinal in the example selected.

Although a specific example is chosen above, it should be clear that appropriate logic is provided to achieve a natural binary accumulation on the basis of the known few equivalents which will be generated. The $B_1$ stage, which indicates a one in the output number, is either brought up or not brought up depending on whether a one exists in the unit's ordinal of the natural binary number. To establish the proper logic to bring the other stages up and down as the accumulation is conducted, the Up or Down status of $B_1$ can be ignored. The single one value represented by $B_1$ Up will continue as a part of the subtotals and of the final totals in a proper manner. In design of the logical signals used, it is necessary to determine to what extent a given equivalent increases the numbers already in the register to provide logical means for causing that status to pulse the proper B register.

C. Decoding the B Stages

The subtractor of the preferred embodiment of this invention operates upon natural binary coded numbers. Since the number is actually one ordinal of a decimal notation, it is probably more accurate to denominate this notation as a binary coded decimal notation. In this context the two notations are the same. Nevertheless, since the B stages are in a special notation, decoding is necessary. The number stored in delay register 9 and ultimately in decimal word register 15 is also in binary coded decimal notation.

The decoding is straightforward. Reference is made to FIG. 5. The concurrence of 1 ordinal time and $B_1$ Up indicates that a binary "one" should occur in the decoded number. A binary "one" should appear at the 2 ordinal time when either $B_2$ or $B_6$ is Up. A binary "one" should appear at the 4 ordinal time when either $B_4$ or $B_6$ is Up. Appropriate OR logic is provided. $B_8$ Up is connected directly in an AND relationship to the clock source, since a "one" bit should occur at 8 ordinal time only when $B_8$ is Up.

MACHINE SEQUENCE

In actual operation in a data processing machine a preferred machine sequence would be as follows. The actual radix conversion would be accomplished in the manner described above.

Word Cycle 1: Test binary word register 1 for plus or minus sign—store sign.

Word Cycle 2: Complement the binary word register 1 if the sign indicates that the stored word is complemented.

Word Cycle 3: Read binary word register 1 to accumulate the units ordinal value in the radix 10 in units accumulator 5.

Simultaneously test binary word register 1 for zero balance.

Word Cycle 4: Transfer value of units accumulator 5 to delay register 9.

Simultaneously subtract in subtractor 19 the value in units accumulator 5 from the value in binary word register 1.

Word Cycle 5: Transfer the value in binary word register 1 to divider 17; store the result (one-fifth of the previous value) in binary word register 1.

Word Cycle 6: Transfer the value in binary word register 1 through delay 37, line 39, and switch 35 back to binary word register 1, thereby computing one-tenth the original number.

Word Cycle 7: Repeat word cycle 3 and continue until a zero balance is observed. Contents of delay register 9 may be transferred as desired. Immediate transfer to an output device results in the number being presented low decimal ordinal first. Recirculating through line 11, and switch 13 to decimal word register 15 stores the word for subsequent access high ordinal first.

While the invention has been particularly shown and described with reference to preferred embodiments thereof, it will be understood by those skilled in the art that the foregoing and other changes in form and details may be made therein without departing from the spirit and scope of the invention.

I claim:

1. An apparatus for converting data representations in a first radix to data representations in a second radix comprising:
- a data storage means for storing data in said first radix;
- generating means responsive to said data storage means to generate unique signals representative of each different equivalent in said second radix of the ordinals of the data stored in said data storage means;
- accumulator means responsive to said unique signals for summing equivalents in said second radix of the ordinals of the data stored in said data storage means to form one ordinal in said second radix while ignoring carries to the next higher ordinal position in said second radix;
- division means responsive to said data storage means to divide the data stored therein by said second radix to produce a quotient, fractional remainders being ignored, said quotient being stored in said data storage means; and
- means to repeat the operation of the above recited apparatus wherein said accumulator sums equivalents in the next higher ordinal position in said second radix upon subsequent operation until such quotient is reduced to zero whereby the data stored originally in said data storage means and represented in said first radix is converted into data stored in said accumulator means and represented in said second radix.

2. The apparatus in claim 1 wherein said first radix is equal to 2 and said second radix is equal to 10.

3. A system to convert a first number, said first number being represented in natural binary notation by the conditions of a machine, to a number represented by conditions of a machine in decimal notation comprising:
- means to generate signals consisting of five unique response conditions;
- means relating said five unique response conditions to the ordinals of said natural binary number, one response condition being related to the lowest ordinal of said natural binary number, and the other response conditions each being related to a different one of the next higher ordinals and recurring in every forth one of said next higher ordinals, each of said conditions being generated only in response to the presence of a binary one in the position of the related ordinal;
- adding means comprising at least the low decimal order stages of an accumulator operative in a decimal notation and effective to add the value of one to the contents upon occurrence of said response condition related to said lowest binary ordinal, to add the value of two to the contents upon occurrence of said response condition related to the second natural binary ordinal, to add the value of four to the contents upon occurrence of the response condition related to the third natural binary ordinal, to add the value of eight to its contents upon occurrence of the said response condition related to the fourth natural binary ordinal, and to add the value of six to the contents upon occurrence of said response condition related to the fifth natural binary ordinal.

4. The combination as in claim 3 also comprising means to divide said first number by ten to produce a natural binary quotient and means comprising substantially the same means as operated on the first number to convert said quotient to a decimal notation.

5. The combination as in claim 4 also comprising means to continue the operation of the system until said quotient is zero in value.

6. A method automatically performed on an electronic computing apparatus for converting numerical data representations in a first radix to numerical data representations in a second radix comprising the sequential steps of:
- a first step of assigning one of five different equivalent values to each low ordinal position in said first radix representation, one equivalent value being related to the lowest ordinal in said first radix, the other equivalent values each being related to a different one of the next higher ordinals and recurring in every fourth one of said next higher ordinals;
- a second step of adding said equivalent values in those ordinal positions having a numerical representation other than zero in order to derive the value of an ordinal in said second radix representation, carries to the next higher ordinal position in said second radix being ignored;
- a third step of dividing the data represented in said first radix by said second radix to produce a quotient and a fractional remainder;
- a fourth step of removing the fractional remainder from said quotient to produce a truncated quotient; and repeating the above four steps in order to form successively higher ordinals in said second radix using said truncated quotient as the data represented in said first radix until said truncated quotient becomes equal to zero.

* * * * *